Figure 1:
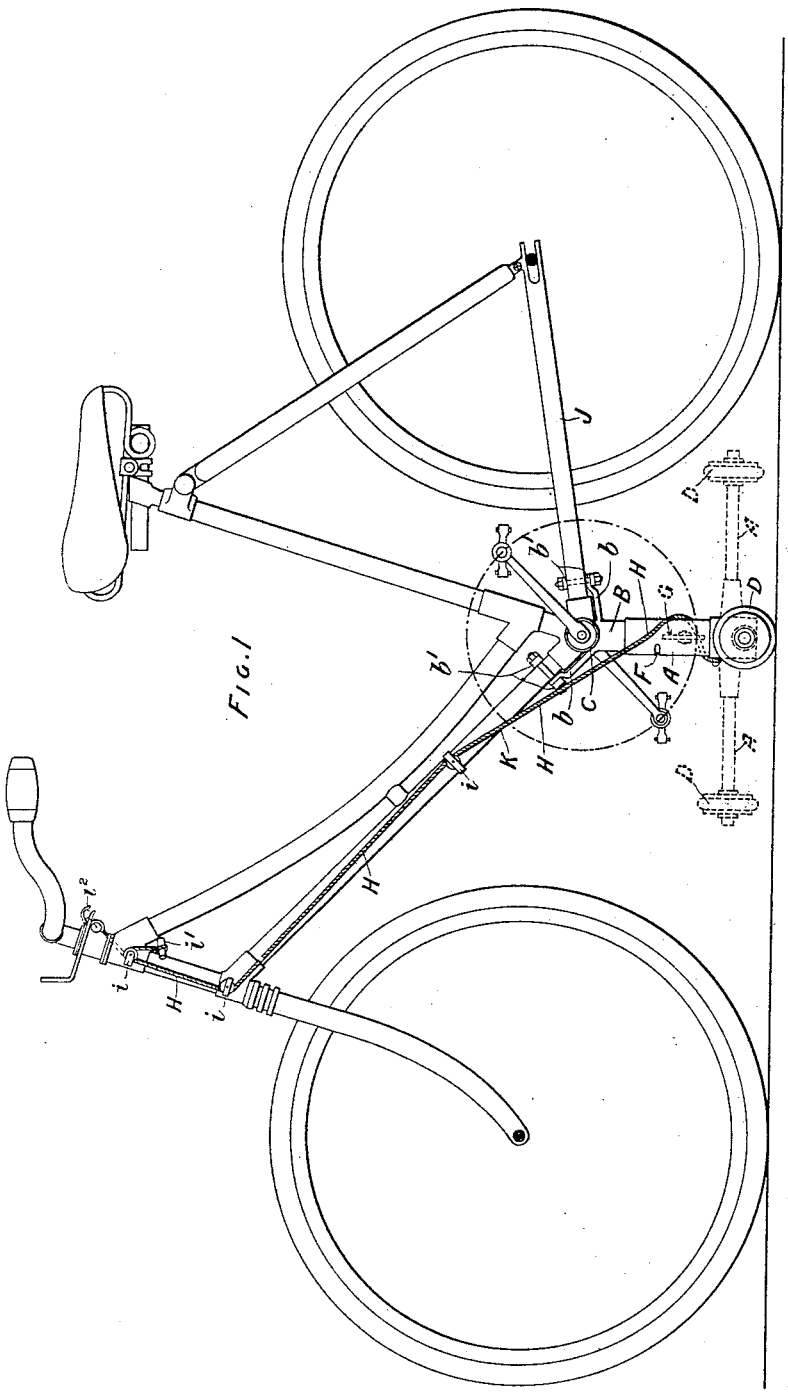

No. 616,384. Patented Dec. 20, 1898.
W. F. WILLIAMS.
BICYCLE SUPPORT.
(Application filed Apr. 7, 1897.)

(No Model.) 2 Sheets—Sheet 1.

WITNESSES.

INVENTOR:
W. F. Williams
BY
ATTORNEYS

No. 616,384. Patented Dec. 20, 1898.
W. F. WILLIAMS.
BICYCLE SUPPORT.
(Application filed Apr. 7, 1897.)
(No Model.) 2 Sheets—Sheet 2.
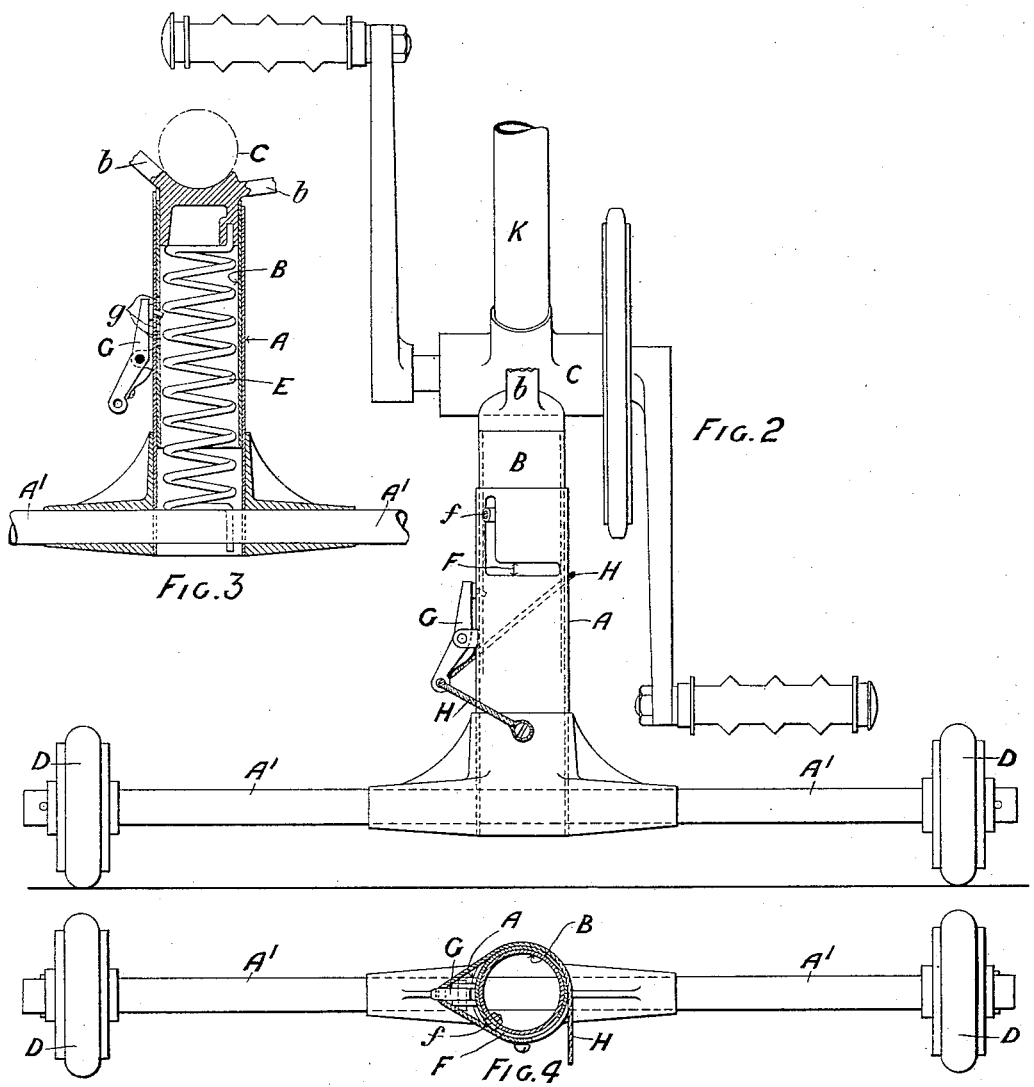

UNITED STATES PATENT OFFICE.

WILLIAM FREDERICK WILLIAMS, OF LONDON, ENGLAND.

BICYCLE-SUPPORT.

SPECIFICATION forming part of Letters Patent No. 616,384, dated December 20, 1898.

Application filed April 7, 1897. Serial No. 631,138. (No model.)

*To all whom it may concern:*

Be it known that I, WILLIAM FREDERICK WILLIAMS, gentleman, of 32 Shaftesbury avenue, London, W., England, have invented a new and useful Improved Bicycle-Support, (which has been patented in Great Britain, No. 27,705, dated December 4, 1896; in France, No. 265,000, dated March 15, 1897, and in Belgium, No. 126,983, dated March 15, 1897,) of which the following is a full, clear, and exact description.

My invention relates to an improved support whereby a bicycle may be maintained in the upright position when traveling very slowly or when stopped altogether, so as to avoid the necessity of the rider dismounting when stopped by crowded traffic or under any other circumstances.

The support when brought down upon the ground projects laterally at each side of the machine in position to act as a broad base, affording the desired stability, and which when raised out of action is caused to assume a fore-and-aft position, the construction and operation of the support being such that the vertical and turning motions are independent, the latter motion being always performed when the support is out of contact with the ground.

The invention is illustrated in the accompanying drawings, forming part of this specification, wherein—

Figure 1 is a side elevation of a bicycle with the support shown in operative position in full lines and out of action in dotted lines. Fig. 2 is a front elevation of the support. Fig. 3 is a vertical section of the pillar portion, and Fig. 4 is a sectional plan.

The same letters of reference denote like parts in all the figures.

The support consists of a ⊥-shaped frame A A', the vertical member A being fitted to slide and turn in or on a pillar B, projecting downward from the bottom bracket C of the machine-frame. The horizontal arms A' terminate in rubber tires or other rollers D, (or they may be feet,) adapted to bear upon the ground, and the turning and lowering movements of the support are effected by a spiral spring E, confined within the guide-pillar B, which is tubular, and acting on the support both by expansion after compression and by torsion, so as to produce the downward and turning movements of the support necessary to bring it into operation, as above mentioned. In order that these movements shall be performed independently and in the required order, the member A of the support is guided by a bayonet-slot-and-stud connection between it and the guide-pillar B, the slot F being made in the tube A and being of L shape, while the stud $f$ is fixed in the guide-pillar B, and by engaging in the slot insures that the horizontal turning movement through a quarter-circle is always performed when the rollers D are out of contact with the ground.

The support is locked in the operative position by a latch-lever G, mounted on the part A, which is caused by a spring to engage with one of a row of holes $g$ in the guide-pillar B, (or with lugs or other means of connection thereon,) so that the support may be moved through a greater or less distance, as may be required to bring the rollers or feet D down to the ground, such distance depending on the size of the wheel and height of the machine-frame from the ground. The release of this latch and likewise the rising and turning movements of the support in opposition to the compression and torsion of the spring E are effected by means of a wire or other cord H, attached to and partially encircling the member A of the support and so acting on the latch-lever G that a pull on the cord will first cause the latch to become disengaged from the hole $g$ and then raise the support and finally turn it to the position shown in dotted lines in Fig. 1. The cord passes through guide-pulleys $i$ on the machine-frame and terminates in a handle $i'$ within easy reach of the rider, which is made fast to a clip $i^2$ or other attachment on the machine-frame in order to retain the support in the raised or inoperative position.

Instead of using a cord H, operated by a direct pull, it will be obvious that the pull upon the portion of the cord which encircles the part A and acts on the latch G may be transmitted through bell-crank lever and link connections from a hand-lever mounted on any convenient part of the frame and locked in position after raising the support by engagement of a locking-bolt in a notched quadrant or adapted to be self-retaining in any other convenient manner.

The horizontal member A' of the support is preferably a rod passed through holes in the tubular member A and there secured by a piece cast around both; but it may be otherwise constructed. The spring E is confined between the closed upper end of the pillar B and the part of the rod A' which crosses the tubular member A, and its bent ends engage with holes in both, as shown in Fig. 3, so that the spring will act both in the longitudinal and circular direction. The pillar B may be brazed into a socket cast with the bottom bracket C, or it may be detachably connected to the bracket C by arms b, adapted to embrace and be secured by straps b' to the members J K of the machine-frame.

I claim—

1. In a bicycle-support, the combination with a guide-pillar projecting downwardly from the frame between the wheels thereof, of an inverted-T-shaped frame having its vertical member sliding on the guide-pillar, a spring acting both by expansion and torsion to turn and lower the frame, a pivoted latch for locking the frame to the guide-pillar, and means for simultaneously releasing the latch and raising and turning the frame, substantially as described.

2. In a bicycle-support, the combination with two tubular members one being a tubular guide-pillar and the other an inverted-T-shaped frame, the vertical member of which is mounted to turn and slide upon the guide-pillar, and a coiled spring acting both by expansion and torsion to turn and lower the inverted-T-shaped frame, of a pivoted and spring-pressed latch on the outer tubular member and engaging the inner member, and a cord secured to and coiled or passed around the outer member and engaging the said latch, substantially as described.

3. A bicycle-support, consisting of a tubular guide-pillar provided with a laterally-projecting stud, an inverted-T-shaped frame, the vertical member of which slides and turns on the pillar, the said vertical member being provided with an L-shaped slot to receive said stud, a spiral spring in the pillar and having its ends secured to the pillar and frame, a latch pivoted on the frame, and engaging the guide-pillar, and a cord secured to and coiled or passed around the vertical member of the frame, said cord engaging the latch, substantially as herein shown and described.

WILLIAM FREDERICK WILLIAMS.

In presence of—
ALBERT H. EDWARDS,
G. F. WARREN.